No. 738,248. PATENTED SEPT. 8, 1903.
G. R. SHERWOOD.
HUSKING MACHINE.
APPLICATION FILED APR. 7, 1903.
NO MODEL. 3 SHEETS—SHEET 1.

Witnesses:

Inventor:
George R. Sherwood,
By
Atty.

No. 738,248. PATENTED SEPT. 8, 1903.
G. R. SHERWOOD.
HUSKING MACHINE.
APPLICATION FILED APR. 7, 1903.
NO MODEL. 3 SHEETS—SHEET 2.

Witnesses:

Inventor:
George R. Sherwood.

No. 738,248. PATENTED SEPT. 8, 1903.
G. R. SHERWOOD.
HUSKING MACHINE.
APPLICATION FILED APR. 7, 1903.
NO MODEL. 3 SHEETS—SHEET 3.
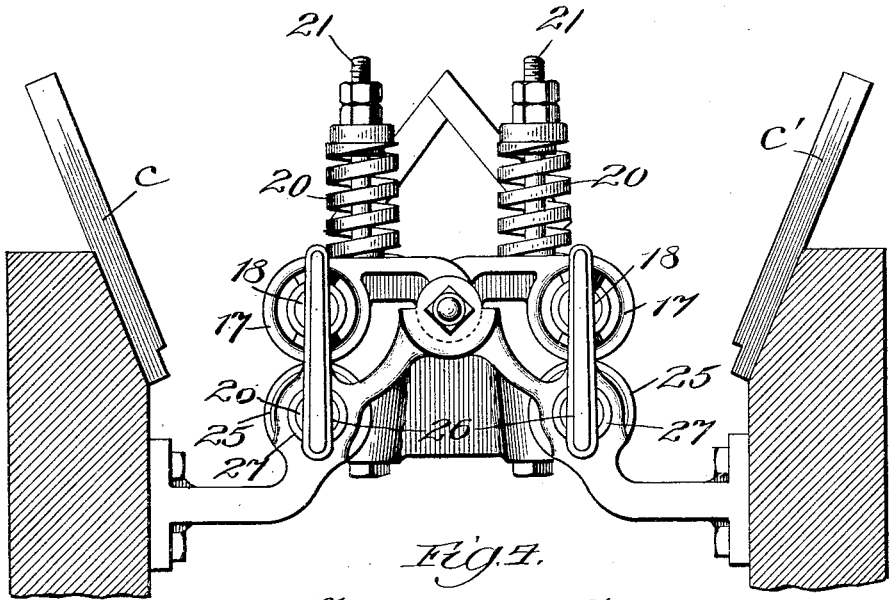
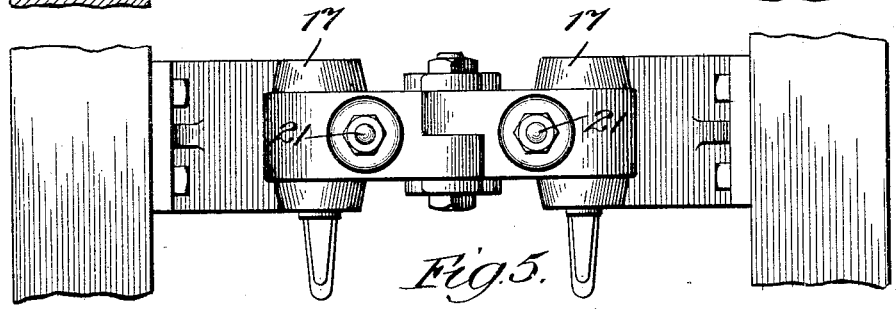
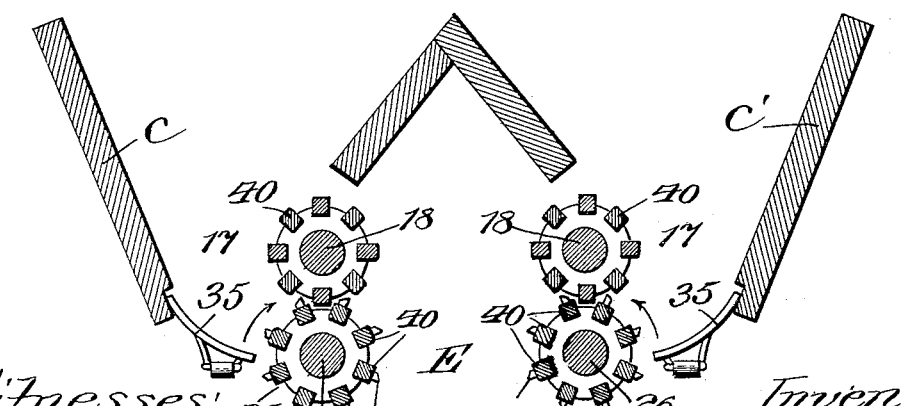

No. 738,248. Patented September 8, 1903.

UNITED STATES PATENT OFFICE.

GEORGE R. SHERWOOD, OF OAKPARK, ILLINOIS, ASSIGNOR TO NATIONAL FIBER & CELLULOSE CO., OF CHICAGO, ILLINOIS, A CORPORATION OF DELAWARE.

HUSKING-MACHINE.

SPECIFICATION forming part of Letters Patent No. 738,248, dated September 8, 1903.

Application filed April 7, 1903. Serial No. 151,471. (No model.)

*To all whom it may concern:*

Be it known that I, GEORGE R. SHERWOOD, a citizen of the United States, and a resident of Oakpark, Cook county, Illinois, (formerly of Chicago, Cook county, Illinois,) have invented certain new and useful Improvements in Husking-Machines, set forth in the following specification.

My invention relates to machines for removing the husks from the ears of corn; and its object is to provide a machine for this purpose which is at once simple, efficient, and reliable in its operation.

Figure 1:
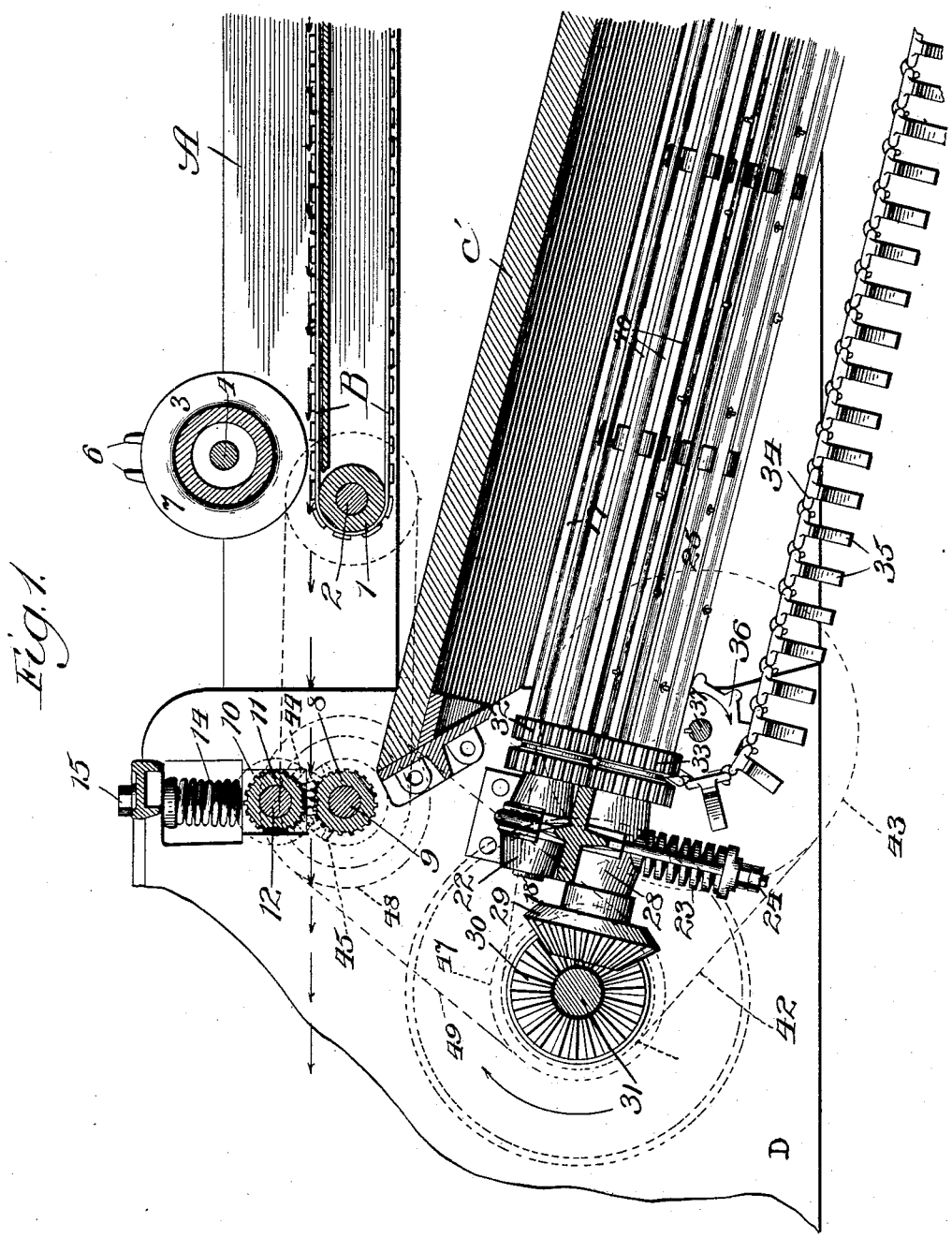
Figure 2:
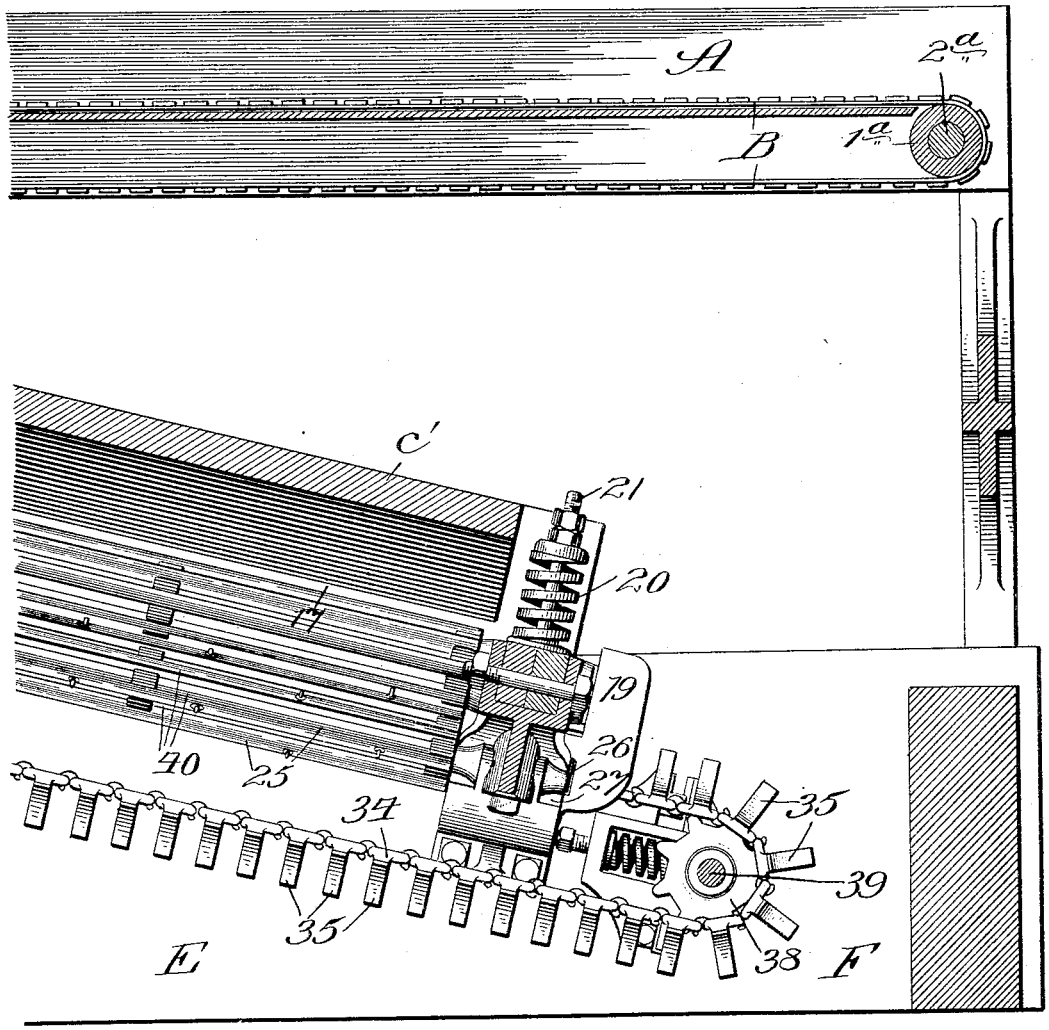

In the drawings, wherein like parts are denoted by like letters and numbers throughout the several figures, Figures 1 and 2 show, partly in elevation and partly in vertical longitudinal section, a machine embodying my invention. Fig. 3 is a view in the direction of the axis of the husking-rolls of the lower husking-roll bracket, its boxes and tension-springs. Fig. 4 is a top view of same parts. Fig. 5 is a mid-cross-section of the husking-rolls and the accompanying hoppers.

In the drawings, A indicates the table or platform for receiving the corn plants as they come from storage or the field, and B the carrier thereon, which I prefer to construct in the form of an endless-belt carrier, driven by roll 1 on shaft 2 and passing over roll 1ᵃ on shaft 2ᵃ. The plants, placed upon this carrier by hand or other suitable means with their butts foremost, are advanced endwise into the grasp of the nipping-rolls, hereinafter described. I have found it convenient, though not necessary, to provide a spreading device 3, which may be mounted on shaft 4 and revolved independently in the fork of the bifurcated piece 6. This roll I have illustrated as provided with grooves 7, adapted to distribute and guide the stalks in substantial parallelism as they are advanced by the carrier B into the grasp of the nipping-rolls. This spreader may, however, be removed and the stalks spread out on the carrier by hand, or other forms of spreader may be used.

The two snapping-rolls 8 and 11 are corrugated and mounted one above the other on shafts 9 and 12, respectively, the lower in fixed bearings, the upper in yielding bearings 10, held in place by the two springs 14, adjustable by screws 15, their movement at the line of nearest approach being in the same direction. The weight of the upper roll and the pressure exerted by springs 14 is sufficient to keep them in working position, while they permit an elastic expansion of the channel through which the stalks are progressing. Power connected to the shaft of the lower roll is transmitted to the shaft of the upper roll by gears. These nipping-rolls snap the ears from the stalks, drop them into the incline-hoppers C and C', and drag the stalks and leaves in the direction of the arrows shown in Fig. 1. I have shown two of these hoppers C and C', though it is obvious that when desired a greater or less number may be used. The hopper C, beneath the traveling table A, is inclined from a point beneath the lower snapping-roll 8, so that the ears which it is adapted to receive as they drop from the snapping-rolls may pass down the incline. As here illustrated, the hopper C is placed in such relation to the nipping-rolls that the ears as they are discharged from such rolls are received on its inclined ends and sides, and thereby conveyed to the husking-rolls. Along one side of each of these hoppers, with their axes similarly inclined, are two husking-rolls, slatted or ribbed longitudinally and mounted one above the other. Of the rolls in the hopper C, the upper roll 17 revolves on shaft 18, the lower end mounted in yielding bearings 19, held in place by springs 20, adjustable by screws 21, the upper end in yielding bearings 22, held in place by springs 23, adjustable by screws 24, lower roll 25 on shaft 26, the lower end in fixed bearings 27, the upper end in fixed bearings 28. On shaft 26 is mounted gear 29, meshing with gear 30 on shaft 31. The rolls 17 and 25 are provided, respectively, with pinions 32 33, which mesh with each other. As will hereinafter be described, the shaft 31 is driven by power in the direction indicated by the arrow in Fig. 1, which causes the rolls to revolve in the direction indicated by the arrows in Fig. 5—that is, the adjacent faces of the rolls move toward each other. The rolls in the hopper C' are similar in construction and operation to the rolls just described.

At the bottom of the hoppers C C' are the endless-chain carriers 34, provided with the curved finger-pieces 35, adapted to hold the ears of corn against the revolving husking-rolls. The carriers 34 pass over the sprockets 36 on shaft 37 and the sprockets 38 on shaft 39, traveling down the hoppers, and are adapted to carry the ears of corn as they are dropped from the nipping-rolls in close contact to the revolving husking-rolls. The shaft 37 revolves in fixed bearings, the shaft 39 in yielding bearings, held in place by springs adjustable by set-screws. The husking-rolls are provided with slats or ribs 40, arranged lengthwise along their periphery. At intervals along the length of the ribs 40 are husking teeth or projections 41, adapted to assist the ribs in turning the ears of corn as they travel along the hopper on chain 34 and to grasp the enveloping husk and tear it free from the ear. The rolls are placed sufficiently near together to allow the ribs to intermesh, and by this means approximately all of the husks are grasped, jerked, and torn from the ears as the latter turn from side to side in their progress down the hopper, the husks being forced between the rolls and discharged beyond them outside the hopper into any suitable carrier, while the ears thus husked and freed from their enveloping covers are carried by the chain to the end of the hoppers and discharged into suitable receptacles. The outside corners of the slats or ribs of the husking-rolls are rounded, as shown in Fig. 5. This prevents the rolls from pinching the ears of corn and shelling them. It also tends to keep the rolls from clogging.

Shaft 31 drives the chain-carriers 34 by means of sprocket-chain 42, passing over a sprocket on shaft 31 and sprocket 43 on shaft 37, thence back over the sprocket on 31. These sprockets are shown in dotted lines in Fig. 1.

D indicates any suitable frame or support for the feed end of my machine, and E any suitable receptacle for the leaves and husks, and F for the ears of corn.

Power is attached in any suitable manner to the shaft 31, which is driven in the direction of the arrow in Fig. 1 and by means of sprockets 47 and 48, and a sprocket-chain 49 drives shaft 9. Shaft 9 has mounted upon it gear 45, which, intermeshing with gear 44 on shaft 12, drives the latter in the direction of the arrows in Fig. 1.

Having thus described my invention, what I claim as new, and desire to secure by Letters Patent, is—

1. The herein-described husking mechanism, consisting of nipping-rolls adapted to remove the ears from the stalks, a pair of inclined parallel rolls, one above the other, having longitudinal intermeshing slats or ribs and rotating toward each other, means for conveying the ears from the nipping-rolls to said inclined rolls, teeth at intervals on the ribs of the lower roll, and an endless carrier having curved fingers adapted to convey the ears longitudinally of said rolls and present them to the lower roll in advance of its engagement with the upper roll, for the purposes described.

2. In a machine for husking corn, the combination of a pair of superposed husking-rolls, longitudinal ribs upon the periphery of said rolls, the ribs upon the lower roll being provided with husking-teeth at intervals, for the purposes described.

3. The combination of a pair of superposed husking-rolls, longitudinal ribs upon said rolls adapted to intermesh, an endless carrier provided with curved fingers moving longitudinally of said rolls adapted to convey and support the ears of corn in contact with the lower of said rolls immediately in advance of its engagement with the upper one of said rolls, for the purposes described.

GEORGE R. SHERWOOD.

Witnesses:
K. S. PARKINSON,
CHARLES L. HINE.